(12) United States Patent
Friesen (10) Patent No.: US 9,598,124 B2
(45) Date of Patent: Mar. 21, 2017

(54) COMBINED FIFTH WHEEL LIFT AND SLIDER ASSEMBLY

(71) Applicant: Pete Friesen, La Crete (CA)

(72) Inventor: Pete Friesen, La Crete (CA)

( * ) Notice: Subject to any disclaimer, the term of this patent is extended or adjusted under 35 U.S.C. 154(b) by 0 days.

(21) Appl. No.: 14/831,931

(22) Filed: Aug. 21, 2015

(65) Prior Publication Data

US 2016/0052568 A1 Feb. 25, 2016

(30) Foreign Application Priority Data

Aug. 21, 2014 (CA) ...................................... 2860313

(51) Int. Cl.
*B62D 53/08* (2006.01)

(52) U.S. Cl.
CPC ..... *B62D 53/0821* (2013.01); *B62D 53/0814* (2013.01)

(58) Field of Classification Search
CPC ............ B62D 53/0821; B62D 53/0814; B62D 53/0807
USPC ...................................................... 280/438.1
See application file for complete search history.

(56) References Cited

U.S. PATENT DOCUMENTS

| | | | |
|---|---|---|---|
| 2,515,575 A * | 7/1950 | Van Langen | B62D 53/0821 280/425.1 |
| 2,613,827 A | 10/1952 | Van Doome | |
| RE23,704 E | 9/1953 | De Lay | |
| 2,799,516 A | 7/1957 | Greenway | |
| 2,807,477 A | 9/1957 | Tuso, Jr. | |
| 2,847,230 A | 8/1958 | Hendrickson et al. | |
| 2,928,684 A * | 3/1960 | Geiger | B62D 53/04 280/425.1 |
| 2,996,312 A | 8/1961 | Paul | |
| 3,057,499 A | 10/1962 | Dorkins | |
| 3,092,399 A | 6/1963 | Hair | |
| 3,139,289 A * | 6/1964 | Richler | B62D 53/0821 280/425.1 |
| 3,180,282 A | 4/1965 | Gutridge et al. | |

(Continued)

FOREIGN PATENT DOCUMENTS

DE 20304666 5/2003
WO 80/01560 8/1980

OTHER PUBLICATIONS

SAF Holland, Owner's Manual, 17 Series Fifth Wheel.
Kalmar, 5th Wheel, Brochure.

*Primary Examiner* — Kevin Hurley
*Assistant Examiner* — Michael Stabley
(74) *Attorney, Agent, or Firm* — Bennett Jones LLP (57) ABSTRACT

A combined fifth wheel lift and slider assembly mountable on a truck frame includes a fifth wheel slidably mounted upon a fifth wheel slider assembly, and vertically elevatable by a frame member; the frame member supporting the fifth wheel slider assembly, the frame member being moveable from a resting position wherein the frame member rests substantially horizontal relative to the truck frame, to an actuating position wherein the frame member is positioned at an angle relative to the truck frame; a hydraulic mechanism for moving the frame member from the resting position to the actuating position wherein the hydraulic mechanism extends upwardly to push the frame member, the fifth wheel assembly, and the fifth wheel in a direction away from the truck cab; and a locking mechanism for securing the frame member in the resting position.

16 Claims, 4 Drawing Sheets

(56) References Cited

U.S. PATENT DOCUMENTS

| | | | | |
|---|---|---|---|---|
| 3,272,546 | A | 9/1966 | Cooley | |
| 3,287,038 | A * | 11/1966 | Candlin, Jr. | B61D 45/005 280/433 |
| 3,337,170 | A * | 8/1967 | Remy | B60S 9/04 254/126 |
| 3,360,280 | A * | 12/1967 | Betchart | B62D 53/0821 280/407 |
| 3,380,758 | A * | 4/1968 | Granning | B62D 53/0821 280/425.1 |
| 3,439,935 | A | 4/1969 | Guidice | |
| 3,450,417 | A | 6/1969 | Cramer et al. | |
| 3,552,774 | A * | 1/1971 | Gottler | B62D 53/0821 280/425.1 |
| 3,580,609 | A | 5/1971 | Paielli | |
| 3,606,386 | A * | 9/1971 | Dorn | B62D 53/0821 254/2 R |
| 3,649,047 | A | 3/1972 | Plantan | |
| 3,677,563 | A * | 7/1972 | Bott | B62D 53/0821 254/88 |
| 3,776,573 | A | 12/1973 | Paielli | |
| 3,810,663 | A * | 5/1974 | Berends | B62D 53/0821 280/425.1 |
| 3,874,703 | A | 4/1975 | Ross et al. | |
| 4,015,879 | A | 4/1977 | Shonkwiler | |
| 4,026,429 | A * | 5/1977 | Rumell | B62D 53/0821 280/438.1 |
| 4,111,273 | A | 9/1978 | Blackburn et al. | |
| 4,391,455 | A | 7/1983 | Fagerstedt | |
| 4,411,444 | A | 10/1983 | Holloway | |
| 4,973,206 | A * | 11/1990 | Engle | B61D 47/005 180/19.2 |
| 5,004,386 | A * | 4/1991 | Schmidt | B61D 45/005 280/438.1 |
| 5,020,820 | A * | 6/1991 | Renner | B60G 9/027 280/124.116 |
| 5,090,720 | A * | 2/1992 | Heider | B62D 53/0821 280/438.1 |
| 5,246,081 | A * | 9/1993 | Engle | B61D 47/005 180/168 |
| 5,294,143 | A | 3/1994 | Järvinen | |
| 5,330,222 | A * | 7/1994 | Halverson | B60G 9/04 280/124.109 |
| 5,464,241 | A * | 11/1995 | Flater | B62D 53/0821 280/425.1 |
| 5,626,356 | A | 5/1997 | Harwood | |
| 5,915,713 | A * | 6/1999 | Kniep | B62D 53/0807 280/418.1 |
| 6,592,140 | B1 | 7/2003 | Alguera et al. | |
| 7,111,862 | B1 * | 9/2006 | Eng | B60G 9/00 280/438.1 |
| 7,726,678 | B1 | 6/2010 | Connell et al. | |
| 7,806,423 | B2 | 10/2010 | Vikstrom et al. | |
| 8,333,399 | B2 | 12/2012 | Brown et al. | |
| 8,342,557 | B2 | 1/2013 | Sibley, Jr. et al. | |
| 8,348,298 | B2 | 1/2013 | Alguera et al. | |

* cited by examiner

COMBINED FIFTH WHEEL LIFT AND SLIDER ASSEMBLY

FIELD OF THE INVENTION

The present invention relates generally to a combined fifth wheel lift and slider assembly mountable on a truck frame for use in lifting and transporting a load, and a method of lifting and transporting a load using same.

BACKGROUND OF THE INVENTION

In the transportation industry, it is often necessary to use a vehicle (for example, a tractor or trailer rig) equipped with a fifth wheel for lifting and moving a structure such as, for example, a house or other building, from sites of loading and unloading. Several prior art fifth wheel assemblies exist; however, they tend to be extremely heavy, bulky and complex, making the fifth wheel assemblies difficult to operate, lift, assemble or disassemble. Prior art fifth wheel assemblies often include inadequate locking of the fifth wheel or other structural flaws, often contrary to transportation and safety regulatory requirements. Accordingly, there is a need in the art for an improved fifth wheel lift which mitigates these problems.

SUMMARY OF THE INVENTION

The present invention relates to a combined fifth wheel lift and slider assembly mountable on a truck frame for use in lifting and transporting a load, and a method of lifting and transporting a load using same.

In one aspect, the invention comprises a combined fifth wheel lift and slider assembly mountable on a truck frame for use in lifting and transporting a load, the assembly comprising:
 a) a fifth wheel slidably mounted upon a fifth wheel slider assembly, and vertically elevatable by a frame member;
 b) the frame member supporting the fifth wheel slider assembly, the frame member being moveable from a resting position wherein the frame member rests substantially horizontal relative to the truck frame, to an actuating position wherein the frame member is positioned at an angle relative to the truck frame; and
 c) a hydraulic mechanism for moving the frame member from the resting position to the actuating position wherein the hydraulic mechanism extends upwardly to push the frame member, fifth wheel assembly, and fifth wheel in a direction up from the truck frame and away from the truck cab.

In one embodiment, the assembly further comprises a locking mechanism for securing the frame member in the resting position.

In one embodiment, the assembly is mounted to the truck frame by a pair of rearward end brackets. In one embodiment, each bracket comprises a body and a hinge portion, the body defining one or more apertures for receiving attachment means therethrough to secure the bracket to the corresponding lateral member, and the hinge portion defining an aperture for receiving attachment means therethrough to hingedly attach the assembly to the rearward end.

In one embodiment, the frame member comprises two substantially parallel opposing side members, an end member, and a cross-beam. In one embodiment, the end member is oriented perpendicularly to the opposing side members, and connects the opposing side members. In one embodiment, the cross-beam is oriented parallel and proximate to the end member, and extends between the opposing side members. In one embodiment, each opposing side member is pivotally connected at a first end to the rearward end, and is fixedly secured at a second end to the end member. In one embodiment, each opposing side member is pivotally connected to the hinge portion of the corresponding bracket.

In one embodiment, the fifth wheel slider assembly comprises a pair of rack members fixedly secured to the opposing side members.

In one embodiment, the hydraulic mechanism comprises a pair of substantially parallel opposing hydraulic cylinders comprising piston rods. In one embodiment, the hydraulic cylinders are pivotally mounted at a first end between the cross-beam and end member, and are supported at a second end by a support member fixed between the lateral members. In one embodiment, the support member comprises first and second side walls and a plurality of retaining bars anchored perpendicularly between the side walls, each retaining bar defining a notch for seating a hydraulic cylinder.

In one embodiment, the opposing side members define corresponding opposed openings extending therethrough. In one embodiment, the openings are positioned adjacent to the cross-beam.

In one embodiment, the assembly further comprises a pair of subframe guides attached to the outer surfaces of the lateral members, each subframe guide defining an aperture for receiving the locking mechanism which is insertable and retainable by the openings of the opposing side members and the apertures of the subframe guides.

In one embodiment, the locking mechanism comprises a locking pin comprising a cylindrical rod, an air cylinder, biasing means, and a plurality of roll pins. In one embodiment, the biasing means comprises a spring.

In another aspect, the invention comprises a method of lifting and transporting a load comprising the steps of:
 a) mounting the above combined fifth wheel lift and slider assembly onto the truck frame, and locking the frame member in the resting position;
 b) at a desired site, coupling the fifth wheel to a load-bearing trailer and slidably adjusting the fifth wheel forwards or backwards; and
 c) unlocking the frame member and actuating the hydraulic mechanism to move the frame member from the resting position to the actuating position, wherein the fifth wheel is elevated vertically by the frame member to lift the load for transport.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF PREFERRED EMBODIMENTS

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

The present invention generally relates to a combined fifth wheel lift and slider assembly mountable on a truck frame for use in lifting and transporting a load, and a method of lifting and transporting a load using same.

In one embodiment, the invention comprises a combined fifth wheel lift and slider assembly mountable on a truck frame for use in lifting and transporting a load, the assembly comprising:
  a) a fifth wheel slidably mounted upon a fifth wheel slider assembly, and vertically elevatable by a frame member;
  b) the frame member supporting the fifth wheel slider assembly, the frame member being moveable from a resting position wherein the frame member rests substantially horizontal relative to the truck frame, to an actuating position wherein the frame member is positioned at an angle relative to the truck frame;
  c) a hydraulic mechanism for moving the frame member from the resting position to the actuating position wherein the hydraulic mechanism extends upwardly to push the frame member, fifth wheel assembly, and fifth wheel in a direction away from the truck cab; and
  d) optionally, a locking mechanism for securing the frame member in the resting position.

In one embodiment, the invention comprises a method of lifting and transporting a load comprising the steps of:
  a) mounting the above combined fifth wheel lift and slider assembly onto the truck frame, and locking the frame member in the resting position;
  b) at a desired site, coupling the fifth wheel to a load-bearing trailer and slidably adjusting the fifth wheel forwards or backwards; and
  c) unlocking the frame member and actuating the hydraulic mechanism to move the frame member from the resting position to the actuating position, wherein the fifth wheel is elevated vertically by the frame member to lift the load for transport.

Figure 1:
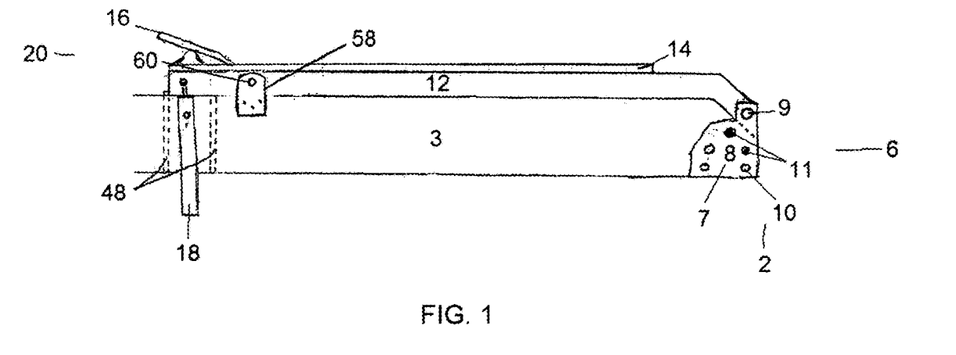
FIG. 1 is a diagrammatic representation of a side view of one embodiment of the present invention, showing the combined fifth wheel lift and slider assembly in the resting position.
Figure 2:
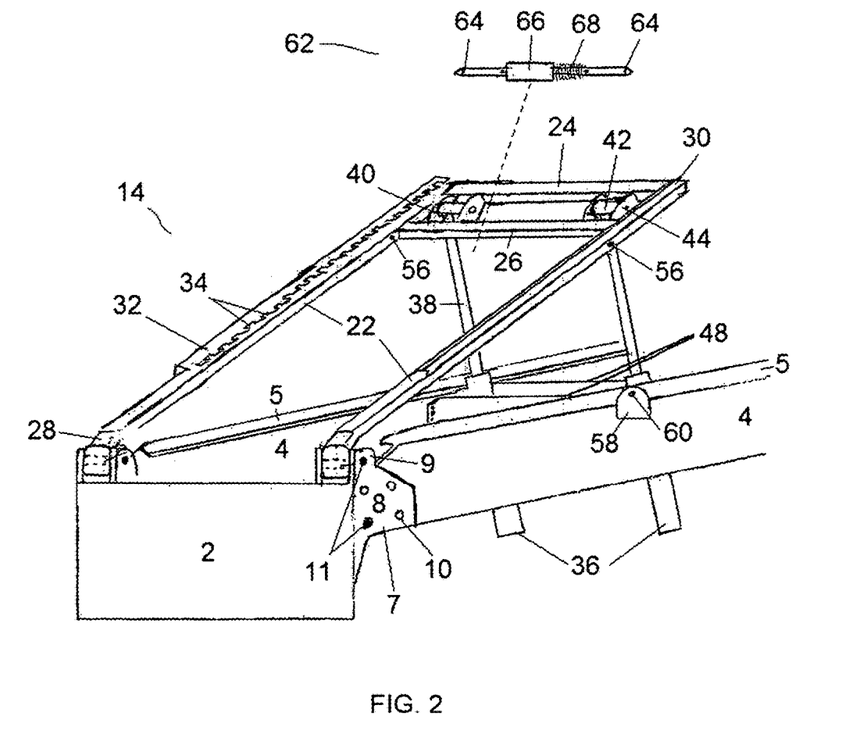
FIG. 2 is a diagrammatic representation of a side view of the embodiment of FIG. 1, showing the combined fifth wheel lift and slider assembly in the actuating position.

FIGS. 1 and 2 generally show one embodiment of the combined fifth wheel lift and slider assembly (1) of the present invention when installed on a conventional truck (not shown) having a forward end (not shown) and a rearward end (2), including a cab at the forward end and a wheeled truck frame (3) extending rearwardly from the cab. The truck frame (3) comprises two substantially parallel opposing lateral members (4) having edges (5) and which are connected to the rearward end (2) by any connection means (6) as are well known in the art, or by using conventional techniques, such as bolting, welding, and the like. Suitable connection means (6) also allow the assembly (1) to be installed or released from the rearward end (2).

In one embodiment, the connection means (6) comprises a pair of rearward end brackets (7). Each bracket (7) is configured to attach a corresponding lateral member (4) to the rearward end (2), and to connect the assembly (1) to the rearward end (2). The shape of the bracket (7) is not limited to that of the present example, but may variously be changed, for example, into a square, parallelogram, or the like.

In one embodiment, each bracket (7) comprises a substantially rectangular-shaped body (8) and a hinge portion (9). The body (8) defines one or more apertures (10) through which attachment means (11) may be inserted to secure the bracket (7) to the corresponding lateral member (4). The hinge portion (9) defines an aperture (10) through which attachment means (11) hingedly attach the assembly (1) to the rearward end (2) to be installed or released from the rearward end (2) (FIGS. 2-4 and 6).

Suitable attachment means (11) include, but are not limited to, bolts, screws, pins, rivets, or other type of fasteners. In one embodiment, the attachment means (11) hingedly attaching the assembly (1) to the rearward end (2) comprises a pin. It is contemplated that the number (density), size (diameter), shape, and positioning of the apertures (10) for an embodiment of the bracket (7) may vary. Apertures (10) may be made using a number of methods known to those skilled in the art, including but not limited to, drilling, water jet cutting, or plasma cutting.

However, it will be understood by those skilled in the art that if desired, the assembly (1) can be permanently attached to the truck frame (3) by welding or other known techniques if the assembly (1) is to be used regularly.

In one embodiment, the assembly (1) generally includes a frame member (12), a fifth wheel slider assembly (14) comprising a fifth wheel (16), a hydraulic mechanism (18), and a locking mechanism (20). The frame member (12) supports the fifth wheel slider assembly (14) upon which the fifth wheel (16) is slidably mounted. The frame member (12) is moveable from a resting position to an actuating position by the hydraulic mechanism (18). The locking mechanism (20) secures the frame member (12), the fifth wheel slider assembly (14), and the fifth wheel (16) in the resting position.

As shown in FIG. 2, the frame member (12) comprises two substantially parallel opposing side members (22), an end member (24), and a cross-beam (26). The end member (24) is oriented perpendicularly to the opposing side members (22), and connects the opposing side members (22). The cross-beam (26) is oriented parallel and proximate to the end member (24), and extends between the opposing side members (22).

Each opposing side member (22) is pivotally connected at a first end (28) to the rearward end (2), and is fixedly secured at a second end (30) to the end member (24). In one embodiment, each opposing side member (22) is pivotally connected to the hinge portion (9) of the corresponding bracket (7). The hinge portion (9) defines an aperture (10) through which attachment means (11) hingedly attach the opposing side member (22) to the rearward end (2) (FIGS. 2-4 and 6).

The frame member (12) supports the fifth wheel slider assembly (14) upon which the fifth wheel (16) is slidably mounted (FIG. 1). In FIG. 2, only a portion of the fifth wheel slider assembly (14) is shown for clarity. In one embodiment, the fifth wheel slider assembly (14), upon which the fifth wheel (16) is slidably mounted, is secured to the opposing side members (22) by suitable connection means (not shown) as are well known in the art, or by using conventional techniques, such as bolting, and the like, to allow the fifth wheel slider assembly (14) to be installed or released from the opposing side members (22). It will be understood by those skilled in the art that if desired, the fifth wheel slider assembly (14) can be permanently attached to the opposing side members (22) by welding or other known techniques.

Figure 3:
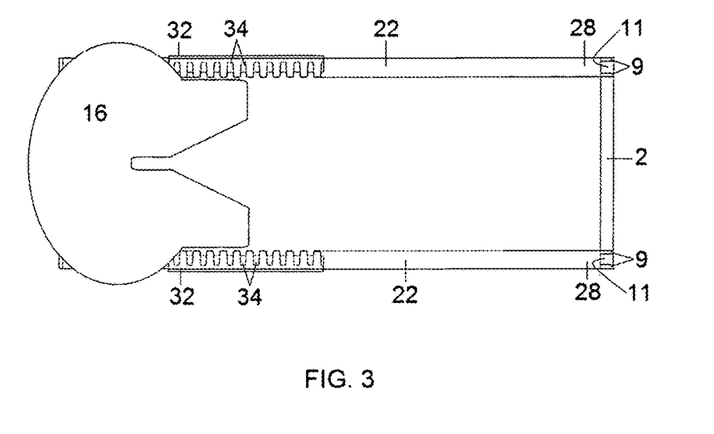
FIG. 3 is a diagrammatic representation of a top view of the embodiment of FIG. 1.

The components and operation of fifth wheel slider assemblies (14) and fifth wheels (16) are commonly known to those skilled in the art and will not be discussed in detail. In general, a conventional fifth wheel slider assembly (14) comprises a pair of rack members (32), one of which is shown in FIG. 2 fixedly secured to an opposing side member (22). Each rack member (32) includes a plurality of notches (34) spaced incrementally along the length thereof. In general, a conventional fifth wheel (16) comprises a rotatable plate defining a wedge-shaped slot, central aperture, hitch locking mechanism, and a pair of leg members mounted to a base plate (FIG. 3). The base plate is attached by a pair of hinges to a carriage which can be moved forward and backward along the rack members (32), and can be locked in a desired position by plungers which lock into the notches (34) of the rack members (32). The fifth wheel (16) can thus be slidably moved forwards or backwards to alter weight distribution on the truck axles and/or to accommodate different lengths of trailer. The fifth wheel (16) in conjunction with a king pin fitted to the trailer connects the truck to the trailer. The kingpin comprises a pin mounted through the center of the trailer upper coupler or bolster plate which mates with the fifth wheel locks, securing the trailer to the fifth wheel (16). The configuration of the fifth wheel (16) is typically controlled by industry standards.

The fifth wheel (16) is both slidable and elevatable. In one embodiment, the fifth wheel (16) is both horizontally slidable along the fifth wheel slide assembly (14), and vertically elevatable by the frame member (12). The fifth wheel (16) is horizontally slidable along the fifth wheel slide assembly (14) to relocate the kingpin center forward or rearward, thereby affecting the weight distribution on the truck axles and/or overall length of the truck and trailer. The frame member (12) upon which the fifth wheel slider assembly (14) and fifth wheel (16) are mounted, is moveable from a resting position to an actuating position by the hydraulic mechanism (18). Since the opposing side members (22) are pivotally connected at their ends (28) to the rearward end (2), the frame member (12) may thus be pivoted relative to the lateral members (4) of the truck frame (3), but any pivotal adjustment possible in the frame member (12) is limited by the lateral members (4). The inclination or pitch angle of the frame member (12) is adjustable within the physical constraints of the lateral members (4), but no side-to-side rotation, commonly referred to as the yaw angle, is possible. The frame member (12) is pivotably mounted to the rearward end (2) to enable two positions of movement, namely a resting position and an actuating position.

In the resting position, the frame member (12) is resting substantially "flat" or horizontal relative to the truck frame (3). In one embodiment, the frame member (12) is positioned at an angle of about 180° relative to the lateral members (4) (FIG. 1).

The frame member (12) is movable from the resting position wherein the frame member (12) is not pivoted or tilted, to the actuating position wherein the frame member (12) is raised or positioned at an angle relative to the truck frame (3) (FIG. 2). In one embodiment, the frame member (12) is positioned at an angle ranging from between about 5° to about 90° relative to the lateral members (4). In one embodiment, the angle is about 45°.

The frame member (12) is connected to the hydraulic mechanism (18) which allows the frame member (12) to be moveable from the resting position to the actuating position. The hydraulic mechanism (18) comprises a pair of substantially parallel opposing hydraulic cylinders (36). The components and operation of hydraulic cylinders (36) are commonly known to those skilled in the art and will not be discussed in detail. Briefly, a hydraulic pump, powered by an appropriate power source, drives oil to the hydraulic cylinders (36) which convert the energy transferred to the oil by the pump to a mechanical output, namely the linear thrust of piston rods (38). The hydraulic cylinders (36) are double-acting, namely able to control a load in two directions.

Figure 4:
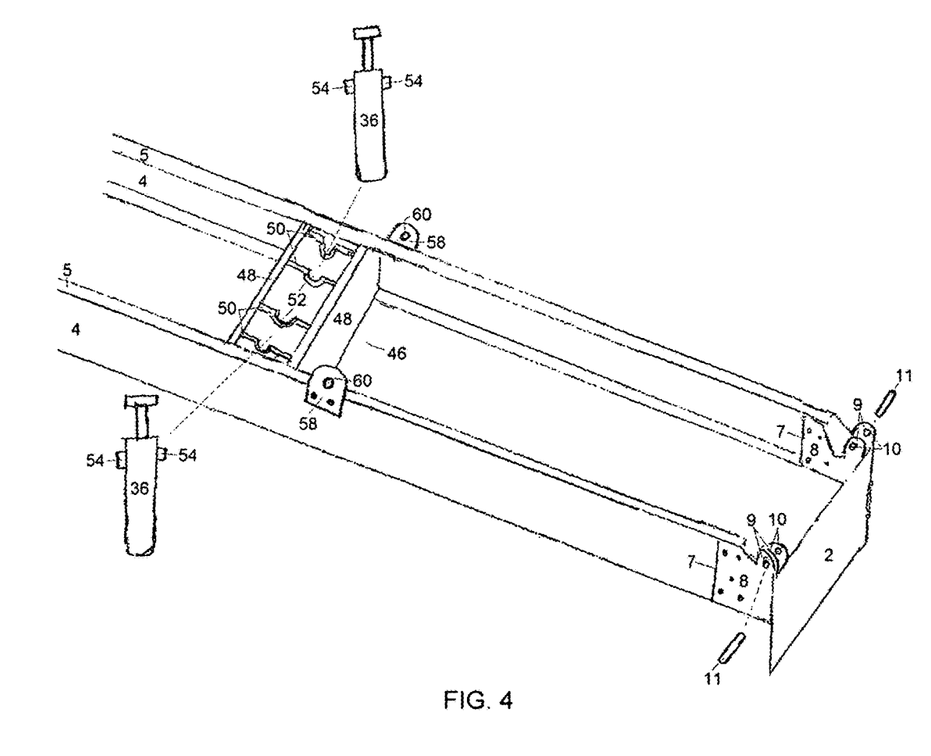
FIG. 4 is a diagrammatic representation of a top view of the embodiment of FIG. 1, with the frame member, fifth wheel slider assembly, and fifth wheel removed.
Figure 5:
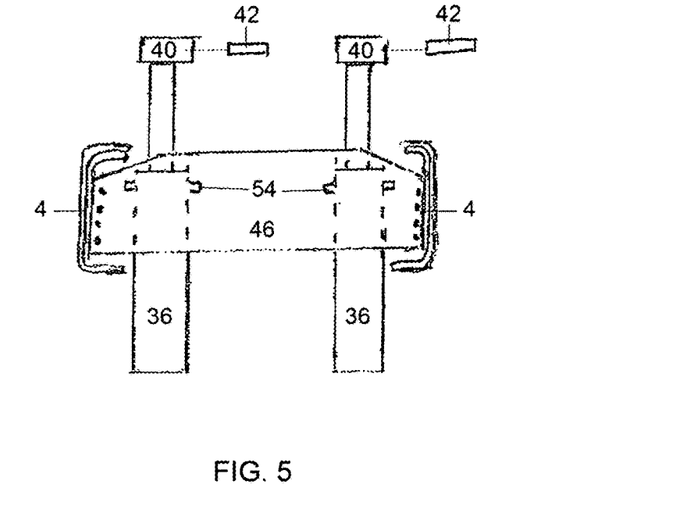
FIG. 5 is a diagrammatic representation of a portion of FIG. 4, showing the support member and top attachment means for the hydraulic cylinders.
Figure 6:
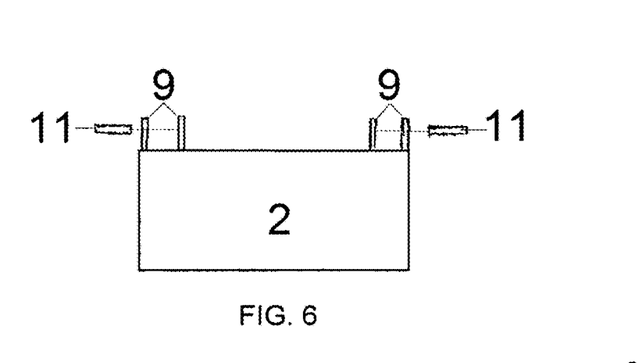
FIG. 6 is a diagrammatic representation of a front view of the rearward end of a truck, showing the hinge portion and attachment means for securing the frame member.

In one embodiment, each hydraulic cylinder (36) is pivotally mounted at one end (40) on a pivot pin (42) secured between the cross-beam (26) and end member (24) by suitable attachment means as are well known in the art including, for example, a bracket (44). The hydraulic cylinders (36) are also supported by a support member (46) which is fixed between the lateral members (4) (FIGS. 2, 4 and 5). The support member (46) comprises first and second side walls (48) and a plurality of retaining bars (50) anchored perpendicularly between the side walls (48). In one embodiment, there are two pairs of retaining bars (50), with each pair supporting one hydraulic cylinder (36). Within each pair, the retaining bars (50) are spaced apart at a distance sufficient to accommodate the hydraulic cylinder (36). Each retaining bar (50) defines a notch (52) for seating an arm (54) of a hydraulic cylinder (36) so that the hydraulic cylinder (36) rests upon its arms (54) in between the pair of retaining bars (50). The hydraulic cylinders (36) and the connecting hydraulic hoses (not shown) extend below the lateral members (4). The piston rods (38) provide sufficient output force to lower or raise the frame member (12) between its resting and actuating positions.

A locking mechanism (20) secures the frame member (12), the fifth wheel slider assembly (14), and the fifth wheel (16) in the resting position. The opposing side members (22) define corresponding opposed openings (56) extending therethrough. In one embodiment, the openings (56) are positioned adjacent to the cross-beam (26) (FIG. 2).

Subframe guides (58) are attached to the outer surfaces of the lateral members (4). Each subframe guide (58) comprises a substantially rectangular plate which is attached to the respective lateral member (4) by suitable attachment means including, for example, screws, pins, rivets, bolts and other types of fasteners. Each subframe guide (58) defines an aperture (60) for receiving locking mechanism (20). The locking mechanism (20) may insert into, and are retained by the openings (56) of the opposing side members (22) and the apertures (60) of the subframe guides (58) to lock the frame member (12) in its resting position.

Figure 7:
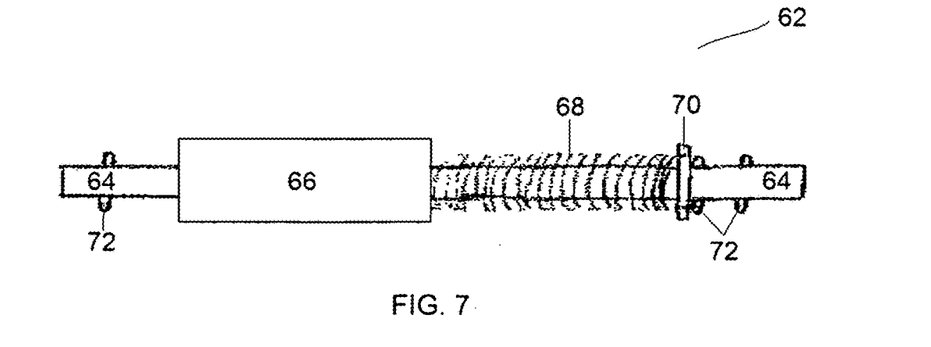
FIG. 7 is a diagrammatic representation of a locking pin.

In one embodiment, the locking mechanism (20) comprises a locking pin (62), which comprises a cylindrical rod (64), an air cylinder (66), biasing means (68), a washer (70), and a plurality of roll pins (72) (FIG. 7). In one embodiment, the biasing means (68) comprises a spring. In one embodiment, the locking pin (62) comprises an air pressure and spring-force operated lock. In the unlocked position, the ends of the cylindrical rod (64) rest within the openings (56) of the opposing side members (22). For the locking position, the air cylinder (66) is actuated by driving air into the air cylinder (66) to produce a force which is transferred to compress the spring (68). Compression of the spring (68) pushes the cylindrical rod (64) further into the apertures (60) of the subframe guides (58). When driven into the apertures (60) which are slightly smaller than their diameters, the roll pins (72) constrict and exert a frictional resilient engagement with the apertures (60). This action holds the cylindrical rod (64) in place tightly and securely. The frame member (12) is thereby locked in the resting position. Release from the locked position is performed by removing the air supply from the air cylinder (66), thereby driving the air cylinder (66) in the opposite direction to remove the force applied to the spring (68), allowing the spring (68) to relax and remove the cylindrical rod (64) from within the apertures (60) of the subframe guides (58).

The dimensions are not essential to the invention and are dictated by the dimensions of the truck frame (3). The dimensions of the assembly (1) may be increased or decreased as may be required to satisfy any particular design objectives; for example, the assembly (1) may be available in a variety of dimensions. In one embodiment, the assembly (I) is sized so as to rest substantially on the edges (5) of the lateral members (4). The assembly (1) has a width which is substantially the same as the width of the rearward end (2) such that the assembly (1) does not extend past the edges (5) of the lateral members (4).

The assembly (1) can be constructed from any material or combination of materials having suitable properties such as, for example, mechanical strength, ability to withstand cold and adverse conditions, and ease of welding. Suitable materials include, but are not limited to, steel, stainless steel, or other appropriate metals.

Where power requirements for the assembly (1) or any component thereof is described, one skilled in the art will realize that any suitable power source may be used, including, without limitation, the truck's electrical system, rechargeable and non-rechargeable batteries, self-contained power units, or other appropriate sources. The operator may be provided with a control panel such as for example, a switch panel, within the cab for operating the assembly (1) or any component thereof.

In operation, the combined fifth wheel lift and slider assembly (1) is mounted or installed onto the frame (3) of the truck. The assembly (1) can be used with any type of truck (for example, light trucks up to 7.5 tonnes, two-axle tractors, two- and three-axle tractors), and for any application including, but not limited to, light distribution traffic (6 tonnes), flexible distribution traffic (15 tonnes), standard long-distance haulage (20 tonnes), heavy good vehicles traffic (36 tonnes), and extremely heavy good transports (45-75 tonnes) including, but not limited to, moving of buildings, houses, structures, or other special transports.

The frame member (12) is mounted or installed in the resting position, as shown in FIG. 1. The frame member (12) and the fifth wheel slider assembly (14) may be locked in the resting position using the locking mechanism (20) such as, for example, for storage purposes while the truck is being driven to meet transportation and safety regulatory requirements. Uncontrolled sliding of the fifth wheel (16) may be prevented by engaging the locking plungers into the notches (34) of the rack members (32).

The truck is driven to the desired site and maneuvered into position with its rearward end (2) in front of the trailer to be attached to the truck. A load may already be loaded and secured onto the trailer. The height of the fifth wheel (16) can be adjusted accordingly to accommodate the height of the trailer, thereby facilitating coupling. Failure to couple with the trailer at the proper height may result in improper coupling, allowing truck and trailer separation. The center of the fifth wheel (16) is aligned with a kingpin fitted to the trailer, since the fifth wheel (16) in conjunction with the kingpin connects the truck to the trailer. The truck is slowly reversed to couple the trailer to the truck by engaging the kingpin to the fifth wheel (16). Typically there is an electronic monitoring and data collection system which monitors the coupling process from inside the cab. Magnetic proximity sensors located on the top plate of the fifth wheel (16) sense the fifth wheel (16) and kingpin locking sequence, relaying the data to the operator through a display in the cab.

The fifth wheel (16) is slidably moved forwards or backwards to perform a pull test to ensure that there will be no separation between the truck and the trailer; to accommodate different lengths of trailer; and/or to alter the weight distribution on the truck axles. There may be an air slide release for sliding the fifth wheel (16) which is operated from the cab of the truck by actuating an air control valve. When actuated, the valve energizes an air cylinder which releases the slide lock and permits re-positioning of the fifth wheel (16). In one embodiment, the ability to unlock the fifth wheel (16), slide the fifth wheel (16), and re-lock the fifth wheel (16) into the desired position may be performed by disengaging (i.e., unlocking) the fifth wheel (16), sliding the fifth wheel (16) horizontally, and engaging (i.e., re-locking) the locking plungers into the notches (34) of the rack members (32).

Figure 8:
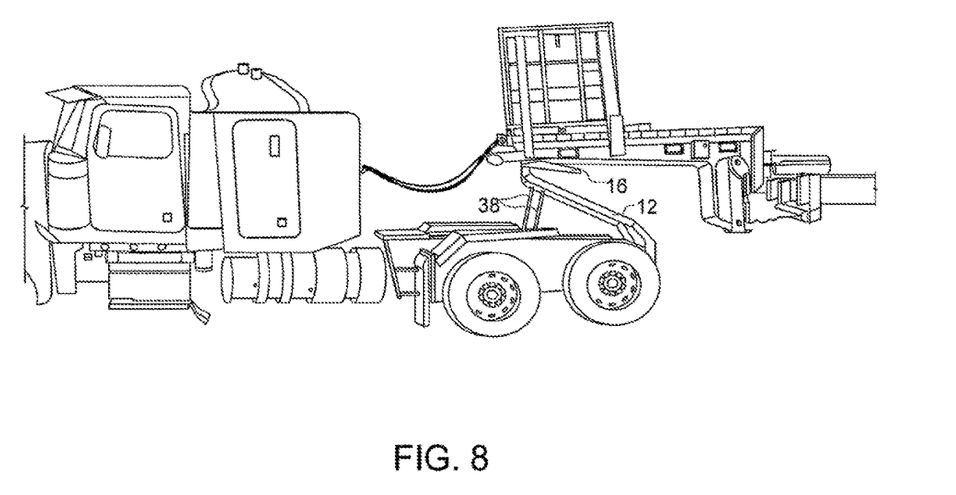
FIG. 8 shows a side view of the embodiment of FIG. 1, showing the combined fifth wheel lift and slider assembly in the actuating position.

After sliding the fifth wheel (16) into the desired position, the frame member (12) is unlocked, and the hydraulic mechanism (18) is actuated to move the frame member (12) from the resting position to the actuating position, wherein the fifth wheel (16) is elevated vertically by the frame member (12). As shown in FIG. 2, the assembly (1) is moveable from a resting position into an actuating position. Elevation is required for example, for lifting of a load for transport to an ideal towing height. Examples of a load include, but are not limited to, a building, house, structure, or other special transport (FIG. 8). In one embodiment, the fifth wheel (16) may be elevated vertically from about 5 inches to about 25 inches. In one embodiment, the fifth wheel (16) may be elevated vertically to more than about 25 inches. FIG. 8 shows a transport or load carrying/actuating position of the assembly (1). The load is supported by the assembly (1) in a position relatively horizontal to the ground. However, a load may also be supported by the assembly (1) at an inclined or tilted position or at an angle to the ground, as desired.

The pressure of the load is brought to bear against the fifth wheel (16), the fifth wheel slider assembly (14), and frame member (12); however, these components (12, 14, 16) fully support and elevate the load imposed upon them. The assembly (1) is configured such that the fifth wheel (16) is supported by the fifth wheel slider assembly (14). In turn, the fifth wheel slider assembly (14) is supported by the frame member (12). The frame member (12) is substantially rectangular-shaped and is supported at its opposing side members (22) by the pair of hydraulic cylinders (36) such that the frame member (12) is adapted to straddle and stabilize the fifth wheel slider assembly (14), the fifth wheel (16), and such load to be transported. Consequently, no twisting or torsional movement can thus occur as a result of the load pressure.

The assembly (1) is configured in such a manner such that as the frame (12), fifth wheel assembly (14), and fifth wheel (16) rise vertically, they draw the load and trailer away from the cab of the truck, and rearwardly towards the vicinity of the rear axle of the truck (FIG. 8). During elevation, the piston rods (38) of the hydraulic cylinders (36) extend upwardly to push the frame member (12), fifth wheel assembly (14), and fifth wheel (16) in a direction away from the cab of the truck, and rearwardly towards the vicinity of the rear axle of the truck. The configuration or construction of the assembly (1) in the form of an S-shape as viewed from the side (FIG. 8) confers advantages.

Due to the effect of gradients (i.e., when the truck is on a level road, or moves uphill or downhill), the fifth wheel (16) articulates or oscillates accordingly forward when the truck moves uphill, or rearward when the truck moves downhill. There must be a minimum of at least about 5° to 8° or more free articulation when the truck and trailer are coupled since clearance between the cab of the truck and the trailer is reduced when the truck moves uphill or downhill, or simultaneously moves around a corner and uphill. The combined abilities to slide the fifth wheel (16) and to elevate the assembly (1) in a direction away from the cab effectively increase the clearance between the back of the cab and the front of the load/trailer. Further, in the event that the load becomes accidentally dislodged, the configuration of the assembly (1) increases the chance that the load will fall in a direction away from the cab, avoiding injury to the operator within the cab.

After the truck towing the trailer carrying its load is driven to the delivery site, the frame member (12), fifth wheel assembly (14), and fifth wheel (16) may be lowered vertically by moving the assembly (1) from the actuating position back to the resting position (FIG. 1). As the frame (12), fifth wheel assembly (14), and fifth wheel (16) lower, they draw the load and trailer towards the cab of the truck. During lowering, the piston rods (38) of the hydraulic cylinders (36) retract to draw the frame member (12), fifth wheel assembly (14), and fifth wheel (16) in a direction back towards the cab. Once the fifth wheel (16) has been sufficiently lowered, the trailer can be disconnected from the truck by unlocking the fifth wheel (16) from the kingpin of the trailer. There may be an air operated lock release for opening the lock mechanism of the fifth wheel (16). The operator may set the tractor parking brake to activate the system and push an air control valve to activate a pneumatic cylinder on the fifth wheel (16) to open the lock mechanism. The load can thus be safely removed or unloaded.

The assembly (1) may be used in a variety of circumstances apart from picking up and delivering materials as described above. For example, the assembly (1) may be used to load, carry or transport, and dump bulk material. Dumping or unloading the material may be easily performed by elevating the fifth wheel (16) to a height sufficient to tilt the material towards the dumping pit. The dumping angle available may be determined by the trailer length, location of the rear axle, and the lifting height.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

REFERENCES

All publications mentioned herein are incorporated herein by reference (where permitted) to disclose and describe the methods and/or materials in connection with which the publications are cited, and are representative of the knowledge and skill of one skilled in the art.

Alguera Gallego, J. M. et al. Sliding device for a fifth wheel. U.S. Pat. No. 6,592,140, issued Jul. 15, 2003.

Alguera Gallego, J. M. et al. Slider with hydraulic cylinder. U.S. Pat. No. 8,348,298, issued Jan. 8, 2013.

Blackburn, K. et al. Terminal tractor. U.S. Pat. No. 4,111,273, issued Sep. 5, 1978.

Brown, A. et al. Slidably adjustable fifth wheel hitch assembly for a vehicle and control system for the same. U.S. Pat. No. 8,333,399, issued Dec. 18, 2012.

Connell, C. et al. Sliding fifth wheel assembly. U.S. Pat. No. 7,726,678, issued Jun. 1, 2010.

Cramer, U. et al. Device for the hitching of a loading platform. U.S. Pat. No. 3,450,417, issued Jun. 17, 1969.

De Lay, M. S. Load equalizing device. U.S. Pat. No. Re 23,704, issued Sep. 1, 1953.

Fagerstedt, N. Tractor vehicle provided with a fifth-wheel plate. U.S. Pat. No. 4,391,455, issued Jul. 5, 1983.

Greenway, W. T. Longitudinally adjustable fifth wheel mounting for trailer trucks. U.S. Pat. No. 2,799,516, issued Jul. 16, 1957.

Guenter, A. Hydraulic or pneumatic lifting device is fastened to semi-trailer by means of guide linkages which enable horizontal raising of fifth-wheel lift plate. German Patent Application No. DE 20304666, published May 6, 2003.

Guidice, W. W. Fifth wheel tractor. U.S. Pat. No. 3,439,935, issued Apr. 22, 1969.

Hair, B. F. Fifth wheel control device. U.S. Pat. No. 3,092,399, issued Jun. 4, 1963.
Harwood, M. R. Adjustable weight distribution system for highway vehicles. U.S. Pat. No. 5,626,356, issued May 6, 1997.
Hendrickson, J. V. et al. Fifth wheel construction for force distribution between tractor and semi-trailer. U.S. Pat. No. 2,847,230, issued Aug. 12, 1958.
Holloway. Load equalized. U.S. Pat. No. 4,411,444, issued Oct. 25, 1983.
Paul, M. F. Fifth wheel weight distributor. U.S. Pat. No. 2,996,312, issued Aug. 15, 1961.
Paielli, M. F. Fifth wheel with load-transferring device. U.S. Pat. No. 3,580,609, issued May 25, 1971.
Paielli, M. F. Load-transferring coupling device. U.S. Pat. No. 3,776,573, issued Dec. 4, 1973.
Plantan, R. S. Elevatable fifth wheel. U.S. Pat. No. 3,649,047, issued Mar. 14, 1972.
Renner, J. J. et al. Tractor suspension. U.S. Pat. No. 5,020,820, issued Jun. 4, 1991.
Richler, M. Tractor with elevatable fifth-wheel. U.S. Pat. No. 3,139,289, issued Jun. 30, 1964.
Tuso, N. Jr. Shiftable fifth wheel mounting for tractor-trailers. U.S. Pat. No. 2,807,477, issued Sep. 24, 1957.
Vikstrom, T. et al. Fifth wheel assembly for coupling a trailer to a truck tractor and a method for operating said assembly. U.S. Pat. No. 7,806,423, issued Oct. 5, 2010.

What is claimed is:

1. A combined fifth wheel lift and slider assembly mountable on a truck frame for use in lifting and transporting a load, the frame having two substantially parallel opposing lateral members connected to a rearward end of the truck, the assembly mounted to the truck frame by a pair of rearward end brackets, the assembly comprising:
   a) a fifth wheel slidably mounted upon a fifth wheel slider assembly, and vertically elevatable by a frame member;
   b) the frame member supporting the fifth wheel slider assembly, the frame member being moveable from a resting position wherein the frame member rests substantially horizontal relative to the truck frame, to an actuating position wherein the frame member is positioned at an angle relative to the truck frame;
   c) a hydraulic mechanism for moving the frame member from the resting position to the actuating position wherein the hydraulic mechanism extends upwardly to push the frame member, fifth wheel assembly, and fifth wheel in a direction up from the truck frame and away from the truck cab; and wherein
   d) each bracket comprises a body and a hinge portion, the body defining one or more apertures for receiving attachment means therethrough to secure the bracket to the corresponding lateral member, and the hinge portion defining an aperture for receiving attachment means therethrough to hingedly attach the assembly to the rearward end.

2. The assembly of claim 1, wherein the frame member comprises two substantially parallel opposing side members, an end member, and a cross-beam.

3. The assembly of claim 2, wherein the end member is oriented perpendicularly to the opposing side members, and connects the opposing side members.

4. The assembly of claim 2, wherein the cross-beam is oriented parallel and proximate to the end member, and extends between the opposing side members.

5. The assembly of claim 2, wherein each opposing side member is pivotally connected at a first end to the rearward end, and is fixedly secured at a second end to the end member.

6. The assembly of claim 5, wherein each opposing side member is pivotally connected to the hinge portion of the corresponding bracket.

7. The assembly of claim 2, wherein the fifth wheel slider assembly comprises a pair of rack members fixedly secured to the opposing side members.

8. The assembly of claim 2, wherein the hydraulic mechanism comprises a pair of substantially parallel opposing hydraulic cylinders comprising piston rods.

9. The assembly of claim 8, wherein the hydraulic cylinders are pivotally mounted at a first end between the cross-beam and end member, and are supported at a second end by a support member fixed between the lateral members.

10. The assembly of claim 9, wherein the support member comprises first and second side walls and a plurality of retaining bars anchored perpendicularly between the side walls, each retaining bar defining a notch for seating a hydraulic cylinder.

11. The assembly of claim 2, wherein the opposing side members define corresponding opposed openings extending therethrough.

12. The assembly of claim 11, wherein the openings are positioned adjacent to the cross-beam.

13. The assembly of claim 11, further comprising a pair of subframe guides attached to outer surfaces of the lateral members, each subframe guide defining an aperture for receiving the locking mechanism insertable and retainable by the openings of the opposing side members and the apertures of the subframe guides.

14. A method of lifting and transporting a load comprising the steps of:
   a) mounting the assembly of claim 1 onto the truck frame, and locking the frame member in the resting position;
   b) at a desired site, coupling the fifth wheel to a load-bearing trailer and, if necessary, slidably adjusting the fifth wheel forwards or backwards; and
   c) unlocking the frame member and actuating the hydraulic mechanism to move the frame member from the resting position to the actuating position, wherein the fifth wheel is elevated vertically by the frame member to lift the load for transport.

15. A combined fifth wheel lift and slider assembly mountable on a truck frame for use in lifting and transporting a load, the assembly comprising:
   a) a fifth wheel slidably mounted upon a fifth wheel slider assembly, and vertically elevatable by a frame member;
   b) the frame member supporting the fifth wheel slider assembly, the frame member being moveable from a resting position wherein the frame member rests substantially horizontal relative to the truck frame, to an actuating position wherein the frame member is positioned at an angle relative to the truck frame;
   c) a hydraulic mechanism for moving the frame member from the resting position to the actuating position wherein the hydraulic mechanism extends upwardly to push the frame member, fifth wheel assembly, and fifth wheel in a direction up from the truck frame and away from the truck cab; and
   d) a locking mechanism for securing the frame member in the resting position, comprising a cylindrical rod, an air cylinder, biasing means, and a plurality of roll pins.

16. The assembly of claim 15, wherein the biasing means comprises a spring.

\* \* \* \* \*